(12) United States Patent
Zama et al.

(10) Patent No.: US 9,902,182 B2
(45) Date of Patent: Feb. 27, 2018

(54) THERMOPLASTIC RESIN FILM, ADHESIVE SHEET, AND THERMAL TRANSFER IMAGE-RECEIVING SHEET

(71) Applicant: YUPO CORPORATION, Tokyo (JP)

(72) Inventors: Takahiro Zama, Ibaraki (JP); Yuta Iwasawa, Ibaraki (JP); Masahiro Yamada, Osaka (JP)

(73) Assignee: TUPO CORPORATION, Tokyo (JP)

( * ) Notice: Subject to any disclaimer, the term of this patent is extended or adjusted under 35 U.S.C. 154(b) by 0 days.

(21) Appl. No.: 15/032,890

(22) PCT Filed: Oct. 31, 2014

(86) PCT No.: PCT/JP2014/079020
§ 371 (c)(1),
(2) Date: Apr. 28, 2016

(87) PCT Pub. No.: WO2015/068643
PCT Pub. Date: May 14, 2015

(65) Prior Publication Data
US 2016/0250876 A1 Sep. 1, 2016

(30) Foreign Application Priority Data
Nov. 6, 2013 (JP) .................................. 2013-230318

(51) Int. Cl.
B41M 5/52 (2006.01)
B41M 5/44 (2006.01)
(Continued)

(52) U.S. Cl.
CPC ................. B41M 5/44 (2013.01); B32B 7/12 (2013.01); B32B 27/08 (2013.01); B32B 27/20 (2013.01);
(Continued)

(58) Field of Classification Search
CPC .. B41M 5/52; B41M 5/5254; B41M 2205/02; B41M 2205/32; C08J 2423/06
(Continued)

(56) References Cited

U.S. PATENT DOCUMENTS 6,592,971 B2 * 7/2003 Ochiai ................. B41M 5/5254
428/195.1
2001/0003731 A1 6/2001 Ochiai et al.
(Continued)

FOREIGN PATENT DOCUMENTS

EP 1114734 A 2/2000
EP 1228891 A 1/2002
(Continued)

OTHER PUBLICATIONS

Japanese Office Action issued in Japanese Application No. 2013-230318, dated Aug. 8, 2017, with English Translation.
(Continued)

*Primary Examiner* — Bruce H Hess
(74) *Attorney, Agent, or Firm* — Greenblum & Bernstein, P.L.C.

(57) ABSTRACT

Provided is a thermoplastic resin film comprising a base layer (A) containing a thermoplastic resin and a coating layer (B) provided on at least one surface of the base layer (A), the coating layer (B) containing components derived from (a) an emulsion containing resin particles formed from an olefin-based copolymer and (b) an ethyleneimine-based resin, wherein the thermoplastic resin film is characterized in that a volume-average particle size of the resin particles contained in the emulsion is from 0.1 to 0.72 μm. The thermoplastic resin film has good coloring performance during printing using gold ink and/or silver ink, has conventional transferability and adhesiveness even in hot melt transfer, and shows little generation of paper dust.

12 Claims, 1 Drawing Sheet

(51) Int. Cl.
- B32B 27/32 (2006.01)
- B41M 5/41 (2006.01)
- B32B 7/12 (2006.01)
- B32B 27/08 (2006.01)
- B32B 27/20 (2006.01)
- C08J 7/04 (2006.01)
- C09J 7/02 (2006.01)
- C09D 11/00 (2014.01)
- C09D 11/101 (2014.01)
- C09D 123/08 (2006.01)

(52) U.S. Cl.
CPC ............ *B32B 27/32* (2013.01); *B41M 5/41* (2013.01); *B41M 5/52* (2013.01); *B41M 5/5254* (2013.01); *C08J 7/047* (2013.01); *C09D 11/00* (2013.01); *C09D 11/101* (2013.01); *C09D 123/0869* (2013.01); *C09J 7/0275* (2013.01); *C09J 7/0296* (2013.01); *B32B 2264/10* (2013.01); *B32B 2307/21* (2013.01); *B32B 2307/4023* (2013.01); *B32B 2439/00* (2013.01); *B32B 2519/00* (2013.01); *B41M 5/5263* (2013.01); *B41M 2205/02* (2013.01); *B41M 2205/32* (2013.01); *C08J 2323/02* (2013.01); *C08J 2423/02* (2013.01); *C08J 2423/06* (2013.01); *C08J 2423/08* (2013.01); *C08J 2479/02* (2013.01); *C09J 2201/162* (2013.01); *C09J 2400/22* (2013.01); *C09J 2423/006* (2013.01); *C09J 2423/046* (2013.01)

(58) Field of Classification Search
USPC .................. 503/227; 428/32.38, 195.1, 32.5
See application file for complete search history.

(56) References Cited

U.S. PATENT DOCUMENTS

2005/0214486 A1    9/2005   Ochiai et al.
2010/0203267 A1    8/2010   Ochiai et al.

FOREIGN PATENT DOCUMENTS

| | | |
|---|---|---|
| JP | S62-29447 A | 2/1987 |
| JP | H5-43815 A | 2/1993 |
| JP | H5-139728 A | 6/1993 |
| JP | H07-290654 A | 11/1995 |
| JP | H07-300568 A | 11/1995 |
| JP | H10-176079 A | 6/1998 |
| JP | H11-256144 A | 9/1999 |
| JP | H11-349846 A | 12/1999 |
| JP | 2001-158863 A | 6/2001 |
| JP | 2001-219661 A | 8/2001 |
| JP | 2002-113959 A | 4/2002 |
| JP | 2002-220547 A | 8/2002 |
| JP | 2002-326465 A | 11/2002 |
| JP | 2002-363443 A | 12/2002 |
| JP | 2004-122774 A | 4/2004 |
| JP | 2005-336467 A | 12/2005 |
| JP | 2010-66512 A | 3/2010 |
| WO | 2014/092142 A1 | 6/2014 |

OTHER PUBLICATIONS

International Search Report issued with respect to Application No. PCT/JP2014/079020, dated Dec. 2, 2014.

International Preliminary Report on Patentability issued with respect to Application No. PCT/JP2014/079020, dated May 10, 2016.

The Silicone Handbook (published by Nikkan Kogyo Shimbun Ltd., pp. 518 to 530),1990.

pp. 20 to 88 of the Handbook of Adhesives, 3rd edition (published by the Japan Adhesive Tape Manufacturers Association),2006.

Extended European Search Report in respect to European Application No. 14860598.3, dated May 31, 2017.

* cited by examiner

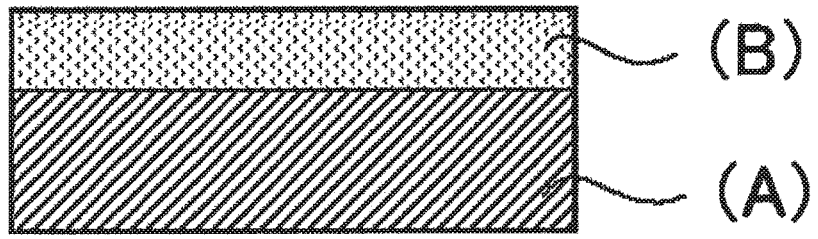

THERMOPLASTIC RESIN FILM, ADHESIVE SHEET, AND THERMAL TRANSFER IMAGE-RECEIVING SHEET

TECHNICAL FIELD

The present invention relates of a thermoplastic resin film, an adhesive sheet, and a thermal transfer image-receiving sheet. More specifically, the present invention relates to a thermoplastic resin film that has excellent coloring performance during printing using gold ink and/or silver ink, has excellent ink transferability and adhesiveness in printing using a thermal transfer printer, and generates little paper dust; and to an adhesive sheet and a thermal transfer image-receiving sheet that use the thermoplastic resin film.

BACKGROUND ART

Various printing papers, various poster papers, various label papers, and recording papers such as ink-jet recording paper, heat-sensitive recording paper, thermal transfer receiving paper, pressure-sensitive recording paper, and electrophotographic recording paper used in applications that require water resistance, weather resistance, and durability, and also adhesive paper that uses the above recording papers that have been proposed in the past include film synthetic papers obtained by blending inorganic fine particles or organic filler in a thermoplastic resin such as polyolefin resin or polyester resin, followed by stretching, and papers in which a transparent stretched film having the above thermoplastic resins as a main raw material is used as a substrate on which a recording layer suited to the above recording methods is provided on at least one surface of the substrate.

For example, Patent Document 1 discloses a laminate film in which a layer (laminated film) having acrylic resin as the main component is provided on at least one surface of a thermoplastic resin film.

Additionally, Patent Document 2 proposes a thermal transfer image-receiving film in which a coating layer, made from an aqueous dispersion in which olefin-based copolymer is dispersed and a polyimine-based polymer or an ethyleneimine adduct of polyamine polyamide, is provided on the surface of a substrate made from thermoplastic resin film, wherein the average particle size of the olefin-based copolymer of the aqueous dispersion is stipulated as not greater than 5 µm. Here, an example that uses an aqueous dispersion of olefin-based copolymer of average particle size 0.74 µm is also described.

CITATION LIST

Patent Literature

Patent Document 1: Japanese Unexamined Patent Application Publication No. H7-290654A
Patent Document 2: Japanese Unexamined Patent Application Publication No. 2002-113959A

SUMMARY OF INVENTION

Technical Problem

However, when the present inventors evaluated conventional films for recording paper, they identified the following problems.

Specifically, because the laminate film described in Patent Document 1 lacks adhesiveness, although offset ink is transferred to the laminate film surface when offset printing is performed, there is the problem that the transferred ink ends up easily peeling after it dries.

On the other hand, the film described in Patent Document 2 has the property that the transferred offset ink does not easily peel (sometimes called "adhesiveness" hereinafter) because the coating layer contains a polyimine-based polymer or an ethyleneimine adduct of polyamine polyamide. However, there are the problems that sufficient metallic glossiness is not obtained and printing coloring performance is poor when gold ink and/or silver ink is printed.

Thus, to solve such problems of conventional art, the present inventors proceeded with research with the objective of providing a thermoplastic resin film, an adhesive sheet, and a thermal transfer image-receiving sheet having excellent ink transferability and adhesiveness and having excellent glossiness when gold ink and/or silver ink is printed.

Solution to Problem

As a result of diligent research to solve the above problems, the present inventors discovered that it is crucial that the surface of the thermoplastic resin film be smooth in order to increase glossiness of gold ink and/or silver ink on the film surface. They also found that a thermoplastic resin film, in which smoothness of the film surface is prominently improved, ink transferability and adhesiveness are excellent, and excellent glossiness is obtained when gold ink and/or silver ink is printed, is realized by using an olefin-based copolymer emulsion having a volume-average particle size from 0.1 to 0.72 µm for a coating layer (B) of a thermoplastic resin film. Specifically, the present invention has the following constitution.

[1] A thermoplastic resin film comprising a base layer (A) containing a thermoplastic resin and a coating layer (B) provided on at least one surface of the base layer (A), the coating layer (B) containing components derived from (a) an emulsion containing resin particles formed from an olefin-based copolymer and (b) an ethyleneimine-based resin, wherein the thermoplastic resin film is characterized in that a volume-average particle size of the resin particles contained in the emulsion is from 0.1 to 0.72 µm.

[2] The thermoplastic resin film according to [1], wherein the coating layer (B) further contains (c) an antistatic agent.

[3] The thermoplastic resin film according to [1] or [2], wherein the coating layer (B) further contains (d) a cross-linking agent.

[4] The thermoplastic resin film according to any one of [1] to [3], wherein the thermoplastic resin contains an olefin-based copolymer.

[5] The thermoplastic resin film according to any one of [1] to [4], wherein the base layer (A) contains at least one of an inorganic fine powder and an organic filler.

[6] The thermoplastic resin film according to any one of [1] to [5], wherein the coating layer (B) contains from 10 to 99% by mass of solids derived from the emulsion.

[7] The thermoplastic resin film according to any one of [1] to [6], wherein a coating amount of the coating layer (B) is from 0.05 to 1.40 g/m$^2$.

[8] The thermoplastic resin film according to any one of [1] to [7], wherein the base layer (A) is stretched in at least a uniaxial direction.

[9] The thermoplastic resin film according to any one of [1] to [8], wherein 75 degree glossiness of a surface of the coating layer (B) is from 14 to 50%.

[10] An adhesive sheet comprising the thermoplastic resin film described in any one of [1] to [9] and an adhesive layer (C) provided on a surface of the base layer (A) on a side opposing the coating layer (B) of the thermoplastic resin film.

[11] The adhesive sheet according to [10], wherein a release sheet (D) is provided on a surface of the adhesive layer (C) on a side opposing the base layer (A).

[12] A thermal transfer image-receiving sheet comprising the thermoplastic resin film described in any one of [1] to [9] or the adhesive sheet described in [10] or [11].

Advantageous Effects of Invention

According to the present invention, a thermoplastic resin film, an adhesive sheet, and a thermal transfer image-receiving sheet having excellent ink transferability and adhesiveness and having excellent glossiness when gold ink and/or silver ink is printed can be obtained.

BRIEF DESCRIPTION OF DRAWINGS

FIG. 1 is a cross-sectional view of the thermoplastic resin film of the present invention.

DESCRIPTION OF EMBODIMENTS

The present invention will be described in detail below, but the descriptions of the constituent elements described below are examples of embodiments (representative examples) of the present invention, and the present invention is not specific to these contents.

Note that in the present specification, a range of values expressed as "from x to y" includes the stated minimum and maximum values.

Furthermore, in the present specification, when "(meth) acrylic acid" is stated, it encompasses acrylic acid and methacrylic acid, and when "maleic acid (anhydride)" is stated, it encompasses maleic anhydride and maleic acid.

Additionally, in the present specification, when "main component" is stated, it indicates the component contained in the highest quantity by mass among the components in the relevant composition.

<<Thermoplastic Resin Film>>

The thermoplastic resin film of the present invention is a thermoplastic resin film in which a coating layer (B), containing components derived from (a) an emulsion containing resin particles formed from an olefin-based copolymer and (b) an ethyleneimine-based resin, is disposed on at least one surface of a base layer (A) containing a thermoplastic resin, characterized in that the volume-average particle size of the resin particles contained in the emulsion is from 0.1 to 0.72 μm.

Note that in the descriptions below, (a) the emulsion containing resin particles formed from an olefin-based copolymer is sometimes written as "(a) olefin-based copolymer emulsion."

When printing using gold ink and/or silver ink, smoothness of the printing surface is crucial in order to exhibit good coloring performance. On a surface having low smoothness, light reflects diffusely and the metallic glossiness decreases, and in the case of gold ink, the ink appears brown in color. Aluminum powder, crushed aluminum foil, aluminum flake, and the like have been blended in gold ink and/or silver ink with the objective of eliciting metallic gloss, but it is surmised that when ink containing these is printed on a surface having low smoothness, the degree of orientation will decrease, which will result in diffuse reflection of light. Therefore, in general, there is a method in which the adhered quantity (sometimes called "applied quantity" hereinafter) of gold ink is raised to increase smoothness of the printing surface, but with this method there is a tendency for curing in the interior of the gold ink layer to be insufficient and for adhesiveness to decrease. This tendency is pronounced with ultraviolet-curable ink. This problem is not limited to the offset printing method, and is common to other printing methods that use other non-curing inks, such as relief printing, gravure printing, flexo printing, and silk screen printing, and the like. Thus, in order for the printed matter to have both good coloring performance and strong adhesiveness in printing using gold ink and/or silver ink, it is crucial for the printing surface of the thermoplastic resin film itself to have high smoothness.

In the present invention, focusing on the above point, the volume-average particle size of (a) the resin particles of the olefin-based copolymer emulsion used in the coating layer (B) is stipulated in a relatively small range of 0.1 to 0.72 μm. As a result, the smoothness of the coating layer surface can be markedly improved and gold ink and/or silver ink can be printed with good adhesiveness to the surface of the coating layer (B), and excellent glossiness can be obtained from the printed gold ink and/or silver ink.

Furthermore, regardless of the type of ink, this coating layer (B) has excellent ink transferability and ink adhesiveness, and a distinct and highly durable printed image can be obtained.

Hereinafter, the constitution of each part will be described in detail.

<Coating Layer (B)>

The coating layer (B) functions as a printed layer to which ink is transferred when using the thermoplastic resin film of the present invention as a recording paper, for example.

The coating layer (B) is a layer containing components derived from (a) an emulsion containing resin particles formed from an olefin-based copolymer (an olefin-based copolymer emulsion) and (b) an ethyleneimine-based resin. The coating layer (B) is formed by, for example, coating the surface of a base layer (A) with a coating material for the coating layer, containing (a) an olefin-based copolymer emulsion and (b) an ethyleneimine-based resin, and then drying.

Here, "components derived from (a) an emulsion containing resin particles formed from an olefin-based copolymer and (b) an ethyleneimine-based resin" are an olefin-based copolymer remaining after the solvent of the coating material for the coating layer or the dispersion medium of (a) the olefin-based copolymer emulsion has been volatilized, an ethyleneimine-based resin, and other components added as necessary, and may also include modified products obtained due to these components being modified in the course of forming the coating layer (B).

[(a) Olefin-Based Copolymer Emulsion]

(a) The olefin-based copolymer emulsion used in the coating layer (B) is an emulsion in which a fine particulate olefin-based copolymer has been emulsified or dispersed in an aqueous dispersion medium. "Resin particles formed from an olefin-based copolymer" in the present invention means the olefin-based copolymer that constitutes the emulsion formed by dispersion in an aqueous dispersion medium in this manner.

Due to the coating layer (B) containing components derived from (a) the olefin-based copolymer emulsion, good ink adhesiveness and stability over time of the printed image can be obtained in various printing methods such as offset printing, hot melt transfer printing, electrophotographic printing, and the like. This is surmised to be for the following reason.

Specifically, (a) the olefin-based copolymer emulsion manifests hydrophobicity in the coating layer (B), and has the action of suppressing excessive hydrophilicity in the coating layer (B). As a result, during offset printing, excessive emulsification caused by the contact of the ink transferred to the coating layer (B) and the surrounding moisture is suppressed, and the ink adhesiveness and the stability over time of the printed image are improved. There is also the advantage that the conditions of the printer can be easily controlled.

Additionally, in printing methods that use heating such as hot melt transfer printing and electrophotographic printing, it is surmised that the olefin-based copolymer contained in the coating layer (B) partially melts and is compatible with the hot melt transfer ink or toner, and the hot melt transfer ink or toner is firmly affixed to the coating layer (B).

((a1) Olefin-based Copolymer)

As (a1) the olefin-based copolymer that constitutes the emulsion, it is preferable to use an olefin-based copolymer having good emulsifiability and containing a carboxyl group or salt thereof as a copolymer component. Typical examples of such a copolymer include those obtained by copolymerizing an olefin-based monomer and an unsaturated carboxylic acid or anhydride thereof, and salts thereof.

Olefin-based copolymers obtained by copolymerizing an unsaturated carboxylic acid or anhydride thereof as described above are preferred as (a1) the olefin-based copolymer. Specific examples of such copolymers include ethylene-(meth)acrylic acid copolymers, alkali (earth) metal salts of ethylene-(meth)acrylic acid copolymers, ethylene-(meth)acrylic acid ester-maleic acid (anhydride) copolymers, (meth)acrylic acid graft polyethylene, maleic acid (anhydride) graft polyethylene, maleic acid (anhydride) graft ethylene-vinyl acetate copolymers, maleic acid (anhydride) graft (meth)acrylic acid ester-ethylene copolymers, maleic acid (anhydride) graft polypropylene, maleic acid (anhydride) graft ethylene-propylene copolymers, maleic acid (anhydride) graft ethylene-propylene-butene copolymers, maleic acid (anhydride) graft ethylene-butene copolymers, maleic acid (anhydride) graft propylene-butene copolymers, and the like. One type of these olefin-based copolymers may be used alone or two or more types may be used in combination.

Among these, ethylene-(meth)acrylic acid copolymers, ethylene-(meth)acrylic acid ester-maleic acid (anhydride) copolymers, maleic acid (anhydride) graft ethylene-vinyl acetate copolymers, maleic acid (anhydride) graft (meth)acrylic acid ester-ethylene copolymers, maleic acid (anhydride) graft ethylene-propylene-butene copolymers, maleic acid (anhydride) graft ethylene-butene copolymers, and maleic acid (anhydride) graft propylene-butene copolymers having a melting point or softening point of not greater than 130° C. are preferred due to their excellent ability to receive ink.

((a1) Volume-average Particle Size of Resin Particles Formed from Olefin-based Copolymer)

In the present invention, "volume-average particle size of resin particles" means the volume-average particle size measured using a laser diffraction particle size distribution measurement apparatus (SALD-2200, manufactured by Shimadzu Corporation).

The present invention is characterized in that the volume-average particle size of the resin particles contained in (a) the olefin-based copolymer emulsion is from 0.1 to 0.72 μm.

The volume-average particle size of the resin particles is preferably not less than 0.3 μm and more preferably not less than 0.5 μm, and is preferably not greater than 0.7 μm and more preferably not greater than 0.6 μm.

Because the olefin-based copolymer emulsion used in Patent Document 2 has a relatively large volume-average particle size, it does not form into a film under the hot drying conditions used when providing the coating layer (B), and when observed by a scanning electron microscope (SEM) after coating and drying, resin particles of olefin-based copolymer are sparsely present on the thermoplastic resin film surface.

In contrast, a coating material for the coating layer that contains (a) an olefin-based copolymer emulsion having a volume-average particle size from 0.1 to 0.72 μm can densely form a film on the thermoplastic resin film, and a coating layer (B) having high smoothness can be obtained. Due to the surface of the coating layer (B) formed in this manner being smooth, gold ink and/or silver ink can be printed with good adhesiveness, and excellent glossiness can be obtained from the printed gold ink and/or silver ink.

When the volume-average particle size of the resin particles is greater than 0.72 μm, not only is the smoothness of the coating layer surface lost, but the adhesiveness of the coating layer (B) to the substrate (A) is also adversely affected. On the other hand, it is difficult to prepare an olefin-based copolymer emulsion in which the volume-average particle size is less than 0.1 μm, and even if one could be prepared, its viscosity would be high and it would not be easy to handle.

((a1) Content of Olefin-based Copolymer)

The content of (a1) the olefin-based copolymer in (a) the olefin-based copolymer emulsion is preferably not less than 20% by mass, more preferably not less than 30% by mass, and even more preferably not less than 40% by mass. It is also preferably not greater than 80% by mass, more preferably not greater than 70% by mass, and even more preferably not greater than 60% by mass. When the content is within this range, (a) an olefin-based copolymer emulsion in which the volume-average particle size is from 0.1 to 0.72 μm can be easily obtained.

((a2) Dispersing Agent)

(a2) A dispersing agent may be added to (a) the olefin-based copolymer emulsion as necessary. By so doing, the olefin-based copolymer can be homogeneously dispersed in the dispersion medium and a coating layer surface having higher smoothness can be obtained.

As (a2) the dispersing agent, at least one type selected from nonionic surfactants, nonionic water-soluble polymers, cationic surfactants, and cationic water-soluble polymers is preferably used.

Examples of nonionic surfactants include polyoxyethylene alkyl ethers, polyoxyethylene alkyl aryl ethers, polyoxyethylene-polyoxypropylene block polymers, polyethylene glycol fatty acid esters, polyoxyethylene sorbitan fatty acid esters, and the like.

Examples of nonionic water-soluble polymers include completely saponified polyvinyl alcohol, partially saponified polyvinyl alcohol, modified products thereof, hydroxyethylcellulose, and the like.

Examples of cationic surfactants include stearylamine hydrochloride, lauryltrimethyl ammonium chloride, trimethyloctadecyl ammonium chloride, and the like.

Examples of cationic water-soluble polymers include polymers having a quaternary ammonium salt structure or phosphonium salt structure, nitrogen-containing (meth)

acrylic polymers, nitrogen-containing (meth)acrylic-based polymers having a quaternary ammonium salt structure, and the like.

Among these, cationic water-soluble polymers such as nitrogen-containing (meth)acrylic polymers or nitrogen-containing (meth)acrylic-based polymers having a quaternary ammonium salt structure are particularly preferred from the perspective of adhesiveness to a thermoplastic resin film.

((a2) Added Amount of Dispersing Agent)

The added amount of (a2) the dispersing agent in (a) the olefin-based copolymer emulsion is, in terms of solid content, preferably not less than 1 part by mass, more preferably not less than 3 parts by mass, and even more preferably not less than 5 parts by mass, relative to 100 parts by mass of (a1) the olefin-based copolymer. It is also preferably not greater than 40 parts by mass, more preferably not greater than 35 parts by mass, and even more preferably not greater than 30 parts by mass. By adding (a2) the dispersing agent in an amount within the range given above, the olefin-based copolymer can be dispersed homogeneously so as to result in a volume-average particle size of 0.1 to 0.72 μm. When the added amount of (a2) the dispersing agent is less than 1 part by mass, its effect as (a2) the dispersing agent is not adequately obtained. Conversely, when more than 40 parts by mass of (a2) the dispersing agent is added, the effect of improving poor ink adhesiveness in high-temperature, high-humidity environments tends to be adversely affected.

(Aqueous Dispersion Medium)

As the aqueous dispersion medium of (a) the olefin-based copolymer emulsion, an aqueous dispersion medium in which the used olefin-based copolymer is insoluble or hardly soluble may be used, specific examples of which include water and mixtures of water and a solvent such as ethanol, isopropanol, or acetone.

[(a) Content of Solids Derived from Olefin-based Copolymer Emulsion]

The content of solids of (a) the olefin-based copolymer in the coating layer (B) is preferably not less than 10% by mass, more preferably not less than 20% by mass, and even more preferably not less than 30% by mass, relative to the entire amount of solids of the coating layer. It is also preferably not greater than 99% by mass, more preferably not greater than 98% by mass, and even more preferably not greater than 95% by mass.

[(b) Ethyleneimine-based Resin]

The coating layer (B) contains the above-described components derived from (a) the olefin-based copolymer emulsion, as well as components derived from (b) an ethyleneimine-based resin.

Because (b) the ethyleneimine-based resin has high miscibility with various printing inks, it is surmised to have the action of improving the adhesiveness of the coating layer surface with ink and the like. As a result, a distinct and highly durable printed image can be obtained even when using ultraviolet-curable ink for offset printing, which generally peels easily, or ultraviolet-curable ink for ink jet printing, which bleeds easily.

Examples of (b) the ethyleneimine-based resin include polyethyleneimine, poly(ethyleneimine-urea), ethyleneimine adducts of polyamine polyamide, and alkyl-modified products, cycloalkyl-modified products, aryl-modified products, allyl-modified products, aralkyl-modified products, benzyl-modified products, cyclopentyl-modified products, alicyclic hydrocarbon-modified products, hydroxides, and the like. One type of these exemplified ethyleneimine polymers may be used alone or a plurality of types may be used in combination.

Among these, a modified product obtained by modifying polyethyleneimine or ethyleneimine adducts of polyamine polyamide with a modifying agent such as a halogenated alkyl, a halogenated alkenyl, a halogenated cycloalkyl, or a halogenated benzyl having from 1 to 24 carbons is preferably used. By so doing, adhesiveness of the coating layer (B) with ink can be improved.

Examples of halogenated compounds used as the modifying agent include methyl chloride, methyl bromide, n-butyl chloride, lauryl chloride, stearyl iodide, oleyl chloride, cyclohexyl chloride, benzyl chloride, allyl chloride, cyclopentyl chloride, and the like.

As (b) the ethyleneimine-based resin, brand name Epomin (manufactured by NIPPON SHOKUBAI CO., LTD.) and brand name Polymin SK (manufactured by BASF SE) are commercially available and may be used unaltered or after modification with a modifying agent.

[Content of (b) Ethyleneimine-based Resin]

The content of (b) the ethyleneimine-based resin in the coating material for the coating layer is, in terms of solid content, preferably not less than 1 part by mass and more preferably not less than 2 parts by mass, and preferably not greater than 25 parts by mass and more preferably not greater than 15 parts by mass of (b) ethyleneimine-based resin relative to 100 parts by mass of solids of (a) the olefin-based copolymer emulsion.

When the content of (b) ethyleneimine-based resin is not less than 1 part by mass, the ink adhesiveness of the thermoplastic resin film tends to be stronger. Furthermore, when the content of (b) ethyleneimine-based resin is not greater than 25 part by mass, blocking tends not to occur when the thermoplastic resin films of the present invention are stacked and left to stand.

[Other Components]

As necessary, (c) an antistatic agent, (d) a crosslinking agent, and (e) other adjuvants may be added to the coating layer (B) within a range that does not greatly hinder printing applicability.

((c) Antistatic Agent)

(c) The antistatic agent has the function of suppressing charging of the thermoplastic resin film surface to prevent attachment of dust and to reduce trouble due to static electricity during typing or printing.

(c) The antistatic agent is not particularly limited, but cationic, anionic, amphoteric, or nonionic antistatic agents and the like may be used. It may be an antistatic agent of low molecular weight or an antistatic agent of high molecular weight (polymer).

Examples of cationic antistatic agents include antistatic agents having an ammonium salt structure, a phosphonium salt structure, and the like.

Examples of anionic antistatic agents include antistatic agents having the structure of an alkali metal salt of sulfonic acid, phosphoric acid, carboxylic acid, and the like. Examples of alkali metal salts of these acids include lithium salts, sodium salts, potassium salts, and the like. The anionic antistatic agents may also have an alkali metal salt of acrylic acid, methacrylic acid, maleic acid (anhydride), and the like in its molecular structure.

Examples of amphoteric antistatic agents include antistatic agents containing both the structure of a cationic antistatic agent and the structure of an anionic antistatic agent in the same molecule. The amphoteric antistatic agent may also be a betaine-type antistatic agent.

Examples of nonionic antistatic agents include ethylene oxide polymers having an alkylene oxide structure, polymers having an ethylene oxide polymer component in their molecular chain, and the like.

Examples of other antistatic agents include polymeric antistatic agents having boron in their molecular structure.

As the antistatic agent, a nitrogen-containing polymeric antistatic agent is preferred, and a tertiary nitrogen-containing or quaternary nitrogen-containing acrylic-based resin is more preferred.

One type of these antistatic agents may be used alone or two or more types may be used in combination.

The added amount of (c) the antistatic agent in the coating material for the coating layer is preferably not less than 2 parts by mass, and preferably not greater than 30 parts by mass and more preferably not greater than 20 parts by mass, relative to 100 parts by mass of solids of (a) the olefin-based copolymer emulsion. When the added amount of (c) the antistatic agent is greater than the range given above, ink transferability in offset printing is sometimes unsatisfactory.

((d) Crosslinking Agent)

(d) The crosslinking agent has the function of crosslinking (b) the ethyleneimine-based resin and the like to improve the water resistance of the coating layer (B).

(b) The crosslinking agent is not particularly limited, but epoxy-based, isocyanate-based, formalin-based, and oxazoline-based water-soluble resins and the like may be used.

Specific examples include bisphenol A-epichlorohydrin resins, epichlorohydrin resins of polyamine polyamide, aliphatic epoxy resins, epoxy novolac resins, alicyclic epoxy resins, brominated epoxy resins, and the like. Above all, epichlorohydrin adducts of polyamine polyamide, monofunctional or polyfunctional glycidyl ethers, or glycidyl esters are preferred, and epichlorohydrin adducts of polyamine polyamide are more preferred. One type of these crosslinking agents may be used alone or two or more types may be used in combination.

The added amount of (d) the crosslinking agent in the coating material for the coating layer is preferably not less than 2 parts by mass, and preferably not greater than 25 parts by mass and more preferably not greater than 15 parts by mass, relative to 100 parts by mass of solids of (a) the olefin-based copolymer emulsion. When the added amount of (d) the crosslinking agent is greater than the range given above, stickiness of the coating layer (B) decreases and ink adhesiveness is sometimes unsatisfactory.

By using (a) the olefin-based copolymer emulsion, (b) the ethyleneimine-based resin, and the various additives in the blending ratios described above, a thermoplastic resin film that is compatible with various printing methods and information recording methods in a balanced manner and exhibits excellent printing quality and excellent water resistance can be obtained.

[Thickness of Coating Layer (B)]

The thickness of the coating layer (B) is preferably not less than 0.01 μm, more preferably not less than 0.05 μm, and particularly preferably not less than 0.1 μm, and is preferably not greater than 5 μm, more preferably not greater than 3 μm, and particularly preferably not greater than 1 μm. Due to the thickness being within the range given above, a thermoplastic resin film with a texture similar to that of general printing paper can be obtained.

[75 Degree Glossiness of Coating Layer Surface]

In the present invention, "75 degree glossiness" means the 75 degree glossiness measured in conformance with the method set forth in JIS P 8142: 2005. This 75 degree glossiness can be measured using a hand-held gloss meter (brand name PG-1, manufactured by NIPPON DENSHOKU INDUSTRIES CO., LTD.).

The 75 degree glossiness of the coating layer surface of the thermoplastic resin film of the present invention is preferably not less than 14%, more preferably not less than 18%, and even more preferably not less than 20%, and is preferably not greater than 50%, more preferably not greater than 35%, and even more preferably not greater than 27%. A coating layer (B) of which the 75 degree gloss is from 14 to 50% has a smooth surface and suitable glossiness. For this reason, gold ink and/or silver ink can be printed with good adhesiveness on the coating layer surface and a better glossiness can be obtained from the printed gold ink and/or silver ink.

<Base Layer (A)>

The base layer (A) contains thermoplastic resin and has the function of supporting the coating layer (B). The base layer (A) may be obtained by forming a thermoplastic resin or a thermoplastic resin composition containing thermoplastic resin and the other components to be described later into a film, and stretching as necessary. Note that in the descriptions below, the formed body obtained by forming a thermoplastic resin or a thermoplastic resin composition containing thermoplastic resin and the other components to be described later into a film is called a "basic material film," and the film obtained by stretching this "basic material film" is sometimes called a "stretched film."

[Thermoplastic Resin]

The type of thermoplastic resin used in the base layer (A) is not particularly limited. Examples include polyolefin-based resins such as ethylene-based resins like high-density polyethylene and medium-density polyethylene, propylene-based resins, polymethyl-1-pentene and ethylene-cyclic olefin copolymers; polyamide-based resins such as nylon-6 and nylon-6,6; aromatic polyesters such as polyethylene terephthalate and copolymers thereof, polyethylene naphthalate and polybutylene terephthalate; thermoplastic polyester-based resins such as aliphatic polyesters like polybutylene succinate and polylactic acid; polycarbonates; polystyrene-based resins such as atactic polystyrene and syndiotactic polystyrene; and the like. One type of these resins may be used alone or a mixture of two or more types may be used.

These thermoplastic resins preferably contain as the main component a polyolefin-based resin or more preferably contain a propylene-based resin because their heat resistance, mechanical characteristics, and chemical resistance are excellent. By including these resins in the base layer (A), a thermoplastic resin film, an adhesive sheet, and a thermal transfer image-receiving sheet having excellent water resistance and chemical resistance can be produced at low cost. In particular, by using a propylene-based resin in the base layer (A), it is possible to confer rigidity (stiffness) suitable for recording paper such as an adhesive sheet, a thermal transfer image-receiving sheet, and the like.

The propylene-based resin may be a propylene homopolymer, or may be a copolymer of the main component propylene with an α-olefin such as ethylene, 1-butene, 1-hexene, 1-heptene, 4-methyl-1-pentene, or the like. The copolymer may be a binary copolymer or a multi-component copolymer that is ternary or higher. The polymer may be a random copolymer or may be a block copolymer.

The stereoregularity of the propylene-based resin is not particularly limited. Propylene-based resins exhibiting isotactic, syndiotactic, or various degrees of stereoregularity may be used. The propylene-based resin preferably contains in the range of 2 to 25% by mass of a resin having a melting point lower than that of propylene homopolymer. Examples of resins having a melting point lower than that of propylene homopolymer include high-density polyethylene, low-density polyethylene, and the like.

[Content of Thermoplastic Resin]

When the base layer (A) is a formed body of a thermoplastic resin composition containing a thermoplastic resin and other components, the content of the thermoplastic resin is preferably not less than 25% by mass of the total amount of the thermoplastic resin composition, more preferably not less than 35% by mass, and particularly preferably not less than 45% by mass. Also, it is preferably not greater than 99% by mass, more preferably not greater than 95% by mass, even more preferably not greater than 92% by mass, and particularly preferably not greater than 90% by mass. By setting the content of thermoplastic resin within the range given above, rigidity, water resistance, and the like that are suitable for a substrate can be provided to the base layer (A).

[Other Components]

In addition to the thermoplastic resin, the base layer (A) may also contain additives such as inorganic particles, organic fillers, heat stabilizers (antioxidants), light stabilizers, dispersing agents, and the like.

(Inorganic Fine Powder, Organic Filler)

By including at least one of inorganic fine powder and organic filler in the base layer (A), the base layer (A) can be whitened or opacified, and can be provided with concealability. As a result, visibility of printed content printed on the surface of the coating layer can be improved. Furthermore, the printed content can be prevented from being seen through from the back surface of the base layer (A) (the surface on the side opposite the coating layer (B) side).

Examples of such inorganic fine powder include heavy calcium carbonate, light calcium carbonate, calcined clay, talc, diatomaceous earth, titanium oxide, barium sulfate, alumina, silica, zinc oxide, magnesium oxide, and the like. The inorganic particles may also be surface-treated with a surface treatment agent. One type of these inorganic fine powders may be used alone or a mixture of two or more types may be used.

Among these inorganic fine powders, heavy calcium carbonate or precipitated calcium carbonate particles or surface-treated products thereof, clay, and diatomaceous earth are preferred, and heavy calcium carbonate or surface-treated products thereof are more preferred. By using such inorganic fine powders, as will be described later, when a basic material film containing the inorganic fine powder is stretched to form the base layer (A), fine voids can be formed well in the film, and the production cost of the thermoplastic resin film can be reduced.

Examples of surface treatment agents of inorganic fine powder include fatty acids and esters thereof, organic acids, sulfuric acid ester anionic surfactants, sulfonic acid anionic surfactants, resin acids or petroleum resin acids or salts (sodium salt, potassium salt, ammonium salt, and the like) and esters thereof, diene-based polymers, nonionic surfactants, inert inorganic oxides, titanate-based coupling agents, silane-based coupling agents, phosphate-based coupling agents, waxes, paraffins, and the like.

Examples of the above fatty acids include capronic acid, caprylic acid, pelargonic acid, capric acid, undecanoic acid, lauric acid, myristic acid, palmitic acid, stearic acid, behenic acid, oleic acid, linoleic acid, linolenic acid, eleostearic acid, and the like.

Examples of the above organic acids include maleic acid, sorbic acid, and the like.

Examples of the above sulfuric acid ester anionic surfactants include long-chain alcohol sulfuric acid esters, polyoxyethylene alkyl ether sulfuric acid esters, sulfated oils, salts thereof, and the like.

Examples of the above sulfonic acid ester anionic surfactants include alkyl benzenesulfonic acid, alkyl naphthalenesulfonic acid, paraffinsulfonic acid, α-olefinsulfonic acid, alkyl sulfosuccinic acid, salts thereof, and the like.

Examples of the above diene-based polymers include polybutadiene, isoprene, and the like.

Examples of the above nonionic surfactants include polyethylene glycol ester surfactants and the like.

Examples of the above inert inorganic oxides include alumina, silica, and the like.

The method of surface treatment of the inorganic fine powder is not particularly limited. Specifically, the inorganic fine powder may be surface-treated by the methods described in Japanese Unexamined Patent Application Publication Nos. H5-43815, H5-139728, H7-300568, H10-176079, H11-256144, H11-349846, 2001-158863, 2002-220547, 2002-363443, and 2010-66512.

The organic filler is fine particles made from resin. The resin that is the main component of the organic filler is preferably immiscible with the thermoplastic resin of the main component contained in the base layer (A). Thermoplastic resins having a melting point or glass transition point higher than that of the thermoplastic resin of the main component contained in the base layer (A), crosslinked thermoplastic resins, thermosetting resins, and the like may be used. By using such a resin, as will be described later, when a basic material film containing the organic filler is stretched to form the base layer (A), fine voids can be formed well in the film. The difference between the melting point or glass transition point of the resin that constitutes the organic filler and that of the main thermoplastic resin that constitutes the base layer (A) is preferably from 120 to 300° C.

When the thermoplastic resin of the main component contained in the base layer (A) is a propylene-based resin, examples of preferred organic fillers include polyethylene terephthalate, polyethylene naphthalate, polybutylene terephthalate, polyamide, polycarbonate, polystyrene, cyclic olefin homopolymer, ethylene-cyclic olefin copolymer, polyethylene sulfide, polyimide, polymethacrylate, polyethyl ether ketone, polyphenylene sulfide, melamine resin, and the like.

The base layer (A) may contain one type of inorganic fine powder alone or two or more types of inorganic fine powder. Furthermore, the base layer (A) may contain one type of organic filler alone or two or more types of organic fillers. Additionally, the base layer (A) may contain one or more types of inorganic fine powder and one or more types of organic fillers.

(Volume-average Particle Size of Inorganic Fine Powder, Average Dispersion Particle Size of Organic Filler)

In the present specification, "volume-average particle size of inorganic fine powder" means the value obtained by measuring the primary particle size of 100 particles of the inorganic fine powder from an image obtained by observing a cross-section of the base layer (A) using a scanning electron microscope (SEM), and then calculating the average from the primary particle size.

Furthermore, in the present specification, "average dispersion particle size of organic filler" means the value obtained by measuring the primary particle size of 100 particles of the organic filler from an image obtained by observing a cross-section of the base layer (A) using a scanning electron microscope (SEM), and then calculating the average from this primary particle size.

Here, the primary particle size is determined from the maximum value (maximum size) of the distance between two points on the outline of the inorganic fine powder or the organic filler, but can be conveniently determined using an image analyzer.

The volume-average particle size of the inorganic fine powder and the average dispersion particle size of the organic filler are preferably not less than 0.01 μm, more preferably not less than 0.05 μm, and even more preferably not less than 0.1 μm, and are preferably not greater than 15 μm, more preferably not greater than 1.5 μm, and even more preferably not greater than 1.3 μm. When the volume-average particle size of the inorganic fine powder and the average dispersion particle size of the organic filler are not less than 0.01 μm, voids are easily formed when the basic material film is stretched, and the thermoplastic resin film can be easily opacified. When the volume-average particle size of the inorganic fine powder and the average dispersion particle size of the organic filler are not greater than 15 μm, a high-strength base layer (A) can be obtained.

(Content of Inorganic Fine Powder and Organic Filler)

When the base layer (A) is a formed body of a thermoplastic resin composition containing a thermoplastic resin and at least one of an inorganic fine powder and an organic filler, the total content of the inorganic fine powder and organic filler is preferably not less than 5% by mass of the total amount of the thermoplastic resin composition, more preferably not less than 8% by mass, and even more preferably not less than 10% by mass, and is preferably not greater than 75% by mass, more preferably not greater than 65% by mass, and even more preferably not greater than 55% by mass. Due to total content of the inorganic fine powder and organic filler being not less than 5% by mass, voids are easily formed when the basic material film is stretched, and therefore the thermoplastic resin film tends to be easily opacified. Conversely, due to the total content of the inorganic fine powder and organic filler being not greater than 75% by mass, a high-strength base layer (A) tends to be easily obtained.

(Heat Stabilizer)

Examples of heat stabilizers include sterically hindered phenol-based antioxidants, phosphorus-based antioxidants, amine-based antioxidants, and the like. The added amount of heat stabilizer is preferably from 0.001 to 1% by mass relative to the total amount of the thermoplastic resin composition.

(Light Stabilizer)

Examples of light stabilizers include sterically hindered amine-based light stabilizers, benzotriazole-based light stabilizers, benzophenone-based light stabilizers, sulfur-based light stabilizers, and the like. The added amount of light stabilizer is preferably from 0.001 to 1% by mass relative to the total amount of the thermoplastic resin composition.

(Dispersing Agent)

The dispersing agent has the function of dispersing the inorganic fine powder in the thermoplastic resin composition, for example. Examples of dispersing agents include silane coupling agents, higher fatty acids such as oleic acid and stearic acid, metal soaps, and polyacrylic acids and polymethacrylic acids or salts thereof. The added amount of dispersing agent is preferably from 0.01 to 4% by mass relative to the total amount of the thermoplastic resin composition.

[Thickness and Layer Structure of Base Layer (A)]

The thickness of the base layer (A) is preferably not less than 30 μm, more preferably not less than 40 μm, and even more preferably not less than 50 μm, and is preferably not greater than 500 μm, more preferably not greater than 400 μm, and even more preferably not greater than 300 μm. The base layer (A) may have a single-layer structure or may have a multilayer structure in which a plurality of layers having different compositions and thicknesses are laminated. By making the base layer (A) into a multilayer structure, various functions can be added, such as writability, printing applicability, friction resistance, secondary workability, and the like.

[Stretching]

The formed body (basic material film) obtained by forming the thermoplastic resin or thermoplastic resin composition into a film is preferably at least uniaxially stretched. In particular, when a basic material film containing at least one of an inorganic fine powder and an organic filler is stretched, a porous resin stretched film having numerous fine voids is obtained. By using a porous resin stretched film as the base layer (A), it is possible to obtain a thermoplastic resin film that is excellent in light-weight and opacity.

Furthermore, when the base layer (A) has a multilayer structure, all of the layers may be stretched or some of the layers may be stretched. When a plurality of the layers are stretched, the number and direction of the stretching axes of the layers may be the same or different. For example, when the base layer (A) is a two-layer structure, the number of stretching axes of the layers constituting the base layer (A) may be combinations such as unstretched/unstretched, unstretched/uniaxial, uniaxial/unstretched, unstretched/biaxial, biaxial/unstretched, uniaxial/uniaxial, uniaxial/biaxial, biaxial/uniaxial, and biaxial/biaxial.

Here, a stretched film obtained by biaxially stretching a basic material film containing inorganic fine powder has numerous fine voids surrounding a nucleus of inorganic fine powder and also has numerous long cracks on the surface, and some of the inorganic fine powder that serves as nuclei protrude from the surface. For this reason, in a configuration without the coating layer (B), when printing such as offset printing is performed, the protruding inorganic fine powder readily drops out, and the dropped inorganic fine powder contaminates the blanket barrel, mixes in with the printing ink, and thereby reduces the ability to print continuously.

In contrast, in the thermoplastic resin film of the present invention, such dropping of the inorganic fine powder can be effectively suppressed and the generation of paper dust can be reduced due to the fact that the coating layer (B) is provided on the surface of the base layer (A), and components derived from (a) the olefin-based copolymer emulsion having a volume-average particle size of 0.1 to 0.72 μm are included in the coating layer (B).

[Physical Properties of Base Layer (A)]

(Density, porosity) In the present specification, "density" is the value calculated by the formula below. In the formula below, "basis weight" is the value measured by weighing a sample punched to a size of 100 mm×100 mm using an electronic balance in conformance with the method set forth in JIS P 8124.

$$\text{Density (g/m}^3\text{)} = \text{basis weight (g/m}^2\text{)/thickness (m)}$$

The density of the base layer (A) is preferably not less than 0.65 g/cm$^3$ and more preferably not less than 0.7 g/cm$^3$, and is preferably not greater than 1.2 g/cm$^3$ and more preferably not greater than 1 g/cm$^3$. Furthermore, the porosity of the base layer (A) defined by formula (1) below is preferably not less than 5% and more preferably not less than 10%, and is preferably not greater than 60% and more preferably not greater than 50%. In the formula below, $\rho_0$ denotes the true density of the base layer (A) determined by the water displacement method, and $\rho$ denotes the density of the base layer (A) determined from the density and blending proportion of each material that constitutes the base layer (A).

[Equation 1]

$$\frac{\rho 0 - \rho 1}{\rho 0} \times 100 \quad (1)$$

$\rho 0$ . . . TRUE DENSITY OF THERMOPLASTIC RESIN FILM
$\rho 1$ . . . DENSITY OF THERMOPLASTIC RESIN FILM Due to the porosity being in the range given above, a thermoplastic resin film that is light-weight and opaque and has excellent strength can be obtained.

(Opacity) In the present specification, "opacity" is the value measured using a color meter in conformance with the method set forth in JIS Z 8722. As the color meter, the touch panel color computer SM-T manufactured by Suga Test Instruments Co., Ltd. may be used.

The opacity of the base layer (A) is preferably not less than 50%, and more preferably not less than 60%. By the opacity of the base layer (A) being not less than 50%, the visibility of printed content printed on the coating layer surface tends to improve. Furthermore, the printed content printed on the thermoplastic resin film can be prevented from being seen through from the back surface of the base layer (A) (the surface on the side opposite the coating layer (B)). As a result, for example, when a bar code is printed with this thermoplastic resin film as the label paper, bar code reading errors can be reduced.

(Whiteness) In the present specification, "whiteness" is the value measured using a color meter in conformance with the method set forth in JIS L 1015. As the color meter, the touch panel color computer SM-T manufactured by Suga Test Instruments Co., Ltd. may be used.

The whiteness of the base layer (A) is preferably not less than 80%, and more preferably not less than 90%. When the whiteness of the base layer (A) is not less than 80%, the visibility of printed content printed on the coating layer surface tends to improve.

<<Production Method of Thermoplastic Resin Film>>

Next, an example of the method of producing the thermoplastic resin film of the present invention will be described.

The production method of the thermoplastic resin film of the present invention includes, for example, a forming step of forming the thermoplastic resin composition to obtain a basic material film, a stretching step of stretching the basic material film to obtain a stretched film, a surface treatment step of performing surface treatment on the stretched film to obtain a base layer (A), a preparation step of the coating material for the coating layer of preparing the coating material for the coating layer for forming the coating layer (B), and a coating layer formation step of coating the base layer (A) with the coating material for the coating layer and drying to obtain a coating layer (B).

Hereinafter, each step will be described.

(1) Forming Step

In this step, the materials of the base layer (A) described above are mixed to prepare a thermoplastic resin composition, and this thermoplastic resin composition is formed into a film to obtain a basic material film.

The forming method of the thermoplastic resin composition is not particularly limited. For example, the thermoplastic resin composition may be formed into a film using cast forming in which molten resin is extruded in a sheet by a single-layer or multilayer T-die, I-die, or the like connected to a screw extruder; calendar forming; roller forming; inflation forming; or the like. The thermoplastic resin composition may also be formed into a film by cast forming or calendar forming a mixture of the thermoplastic resin composition and an organic solvent or oil and then removing the solvent or oil.

(2) Stretching Step

This step is a step of stretching the basic material film obtained in the above step (1) to obtain a stretched film, and is performed as necessary.

The method of stretching the basic material film is not particularly limited, but examples include machine-direction stretching utilizing the circumferential speed differential of a group of rollers; transverse-direction stretching using a tenter oven; rolling; simultaneous biaxial stretching by a combination of a tenter oven and a linear motor; and simultaneous biaxial stretching by a combination of a tenter and a pantograph. Combinations of these stretching methods may also be used.

The basic material film is preferably stretched at a temperature within a range advantageous for the thermoplastic resin contained in the basic material film. When the thermoplastic resin contained in the basic material film is an amorphous resin, the stretching temperature of the basic material film is preferably in a range not less than the glass transition point of the thermoplastic resin. When the thermoplastic resin contained in the basic material film is a crystalline resin, the stretching temperature is preferably in a range not less than the glass transition point of the amorphous portion of the thermoplastic resin and not greater than the melting point of the crystalline portion of the thermoplastic resin.

For example, when the thermoplastic resin contained in the basic material film contains a propylene homopolymer (melting point 155 to 167° C.) as a main component, the stretching temperature of the basic material film is preferably in a range of 152 to 164° C. When the thermoplastic resin contained in the basic material film contains a high-density polyethylene (melting point 121 to 134° C.) as a main component, the stretching temperature of the basic material film is preferably in a range of 110 to 120° C. When the thermoplastic resin contained in the basic material film contains a polyethylene terephthalate (melting point 246 to 252° C.) as a main component, the stretching temperature of the basic material film is preferably in a range of 104 to 115° C.

The stretching speed is not particularly limited, but from 20 to 350 m/min is preferred. The stretching ratio is not particularly limited and is determined as appropriate in consideration of the characteristics and the like of the thermoplastic resin contained in the basic material film. For example, when the thermoplastic resin contained in the basic material film contains a propylene homopolymer or copolymer thereof as a main component, the stretching ratio when stretched in one direction is normally not less than 1.2 times and preferably not less than 2 times, and normally not greater than 12 times and preferably not greater than 10 times. The stretching ratio as an area ratio when biaxially stretched is normally not less than 1.5 times and preferably not less than 10 times, and normally not greater than 60 times and preferably not greater than 50 times. When a thermoplastic resin other than the above is used as a main component, the stretching ratio when stretched in one direction is normally not less than 1.2 times and preferably not less than 2 times, and normally not greater than 10 times and preferably not greater than 5 times. The stretching ratio as an area ratio when biaxially stretched is normally not less than 1.5 times and preferably not less than 4 times, and normally not greater than 20 times and preferably not greater than 12 times.

Additionally, it is preferred that heat treatment be performed after stretching. The heat treatment temperature is preferably not less than the stretching temperature, and not more than 30° C. higher than the stretching temperature. By performing heat treatment, the heat shrinkage ratio in the stretching direction decreases, and winding tightening during product storage as well as undulation due to shrinkage during heating and fusion sealing can be suppressed. Heat treatment is generally performed by rollers or a hot oven, but these may also be combined. From the perspective of obtaining a high treatment effect, heat treatment is preferably performed in a state where the stretched film is held under tension.

The preferred conditions of stretching are as follows.

For example, a base layer (A) composed of a single-layer stretched film may be obtained by uniaxially or biaxially stretching a basic material film made from a thermoplastic resin composition containing from 40 to 99.5% by mass of polyolefin-based resin and from 60 to 0.5% by mass of an inorganic fine powder, at a stretching temperature lower than the melting point of the polyolefin-based resin. The stretching temperature is preferably from 3 to 60° C. lower than the melting point of the polyolefin-based resin.

Furthermore, a base layer (A) having a laminate structure containing a plurality of polyolefin-based resin films may be obtained by a step of stretching a basic material film made from a thermoplastic resin composition containing from 40 to 100% by mass of a polyolefin-based resin and from 60 to 0% by mass of an inorganic fine powder in the machine direction (MD direction) at a temperature lower than the melting point of the polyolefin-based resin to obtain a stretched film stretched in the MD direction, and a step of laminating a basic material film made from a thermoplastic resin composition containing from 25 to 100% by mass of a polyolefin-based resin and from 75 to 0% by mass of an inorganic fine powder on at least one surface of the stretched film to obtain a laminate film.

Furthermore, in the above process, the step of obtaining a laminate film may include a step of stretching a basic material film made from a thermoplastic resin composition containing from 25 to 100% by mass of a polyolefin-based resin and from 75 to 0% by mass of an inorganic fine powder in the transverse direction (TD direction) at a temperature lower than the melting point of the polyolefin-based resin to obtain a stretched film stretched in the TD direction, and a step of laminating the stretched film stretched in the TD direction on the stretched film stretched in the MD direction. The temperatures in the step of obtaining the stretched film stretched in the MD direction and the step of obtaining the stretched film stretched in the TD direction are preferably from 3 to 60° C. lower than the melting points of the respective polyolefin-based resins.

(3) Surface Treatment Step

This step is a step of performing surface oxidation treatment on the stretched film obtained in the above step (2) to obtain the base layer (A), and is performed as necessary. Furthermore, when the step (3) is not performed, the stretched film obtained in the above step (2) is used as the base layer (A), and when the step (3) and the above step (2) are not performed, the basic material film obtained in the above step (1) is used as the base layer (A). Here, the case where the step (2) and the step (3) are performed is described as an example.

Examples of the surface oxidation treatment include corona discharge treatment, flame treatment, plasma treatment, glow discharge treatment, ozone treatment, and the like, and these surface oxidation treatments may also be performed in combination. Among these surface oxidation treatments, corona discharge treatment and flame treatment are preferred. When performing corona discharge treatment, the condition is preferably not less than 600 J/m$^2$ (10 W·min/m$^2$) and more preferably not less than 1,200 J/m$^2$ (20 W·min/m$^2$), and is preferably not greater than 12,000 J/m$^2$ (200 W·min/m$^2$) and more preferably not greater than 10,800 J/m$^2$ (180 W·min/m$^2$). When performing flame treatment, the condition is preferably not less than 8,000 J/m$^2$ and more preferably not less than 20,000 J/m$^2$, and is preferably not greater than 200,000 J/m$^2$ and more preferably not greater than 100,000 J/m$^2$.

(4) Preparation Step of Coating Material for the Coating Layer

In this step, (a) the olefin-based copolymer emulsion is prepared, and the coating material for the coating layer is prepared by mixing the prepared (a) olefin-based copolymer emulsion and (b) the ethyleneimine-based resin.

The method for preparing (a) the olefin-based copolymer emulsion is not particularly limited, but, for example, the following method (1) or (2) may be used.

(1) An olefin-based copolymer is put into an aromatic hydrocarbon-based solvent and heated to melt, to obtain a resin solution. To the resin solution, (a2) the dispersing agent is added and stirred to mix, and then phase transition is performed while adding water. After that, an aqueous dispersion ((a) olefin-based copolymer emulsion) is obtained by distilling out the aromatic hydrocarbon-based solvent.

(2) The olefin-based copolymer is melted using a twin-screw extruder, and then an aqueous solution of (a2) the dispersing agent is added, followed by kneading to obtain an aqueous dispersion ((a) olefin-based copolymer emulsion) is obtained (refer to Japanese Examined Patent Application Publication No. S62-29447A).

When (a) the olefin-based copolymer emulsion is prepared by these methods, a polymeric emulsifier such as a cationic water-soluble polymer is preferably used as (a2) the dispersing agent, and dispersion is preferably performed using a twin-screw extruder in the above (2). As a result, the volume-average particle size of the resin particles in (a) the olefin-based copolymer emulsion is easily adjusted to 0.1 to 0.72 μm. In the method (2), the volume-average particle size of the resin particles in (a) the olefin-based copolymer emulsion can be adjusted by controlling some of the operating conditions of the twin-screw extruder, namely the amount of water relative to the amount of olefin-based copolymer, the cylinder temperature and profile thereof, the residence time of the resin in the extruder, the barrel rotational speed of the extruder, and the like.

The solvent for mixing (a) the olefin-based copolymer emulsion and (b) the ethyleneimine-based resin may be water or may be an organic solvent such as methyl alcohol, ethyl alcohol, isopropyl alcohol, acetone, methyl ethyl ketone, ethyl acetate, toluene, xylene or the like, or it may be a mixed solvent of water and an organic solvent. The solvent is preferably water or a solvent containing water as a main component. Another preferred method that may be used is to dissolve a highly hydrophobic component in the above organic solvent in advance, and then dilute with water. The step becomes easy to manage by these methods.

The solid concentration of the coating agent is preferably not less than 0.1% by mass and more preferably not less than 1.5% by mass, and is also preferably not greater than 20% by mass and more preferably not greater than 15% by mass relative to the entire quantity of coating agent.

(5) Coating Layer Formation Step

In this step, the surface of the base layer (A) obtained in the surface treatment step (3) is coated with the coating material for the coating layer obtained in the preparation step of coating material for the coating layer (4), and then solidified by drying to form the coating layer (B). As a result, the thermoplastic resin film of the present invention is obtained.

Coating with the coating material for the coating layer may be performed using a coating device such as a roll coater, blade coater, bar coater, air knife coater, size press coater, gravure coater, die coater, lip coater, spray coater, or the like.

The coating amount of coating material for the coating layer is preferably not less than 0.05 g/m$^2$ as solid content after drying, more preferably not less than 0.10 g/m$^2$, and particularly preferably not less than 0.15 g/m$^2$, and is preferably not greater than 1.40 g/m$^2$, more preferably not greater than 0.50 g/m$^2$, even more preferably not greater than 0.30 g/m$^2$, and particularly preferably not greater than 0.24 g/m$^2$.

When the coating amount is not less than the minimum value above, ultraviolet-curable ink for offset printing, which generally has poor adhesiveness, can be transferred with good adhesiveness to the surface of the obtained coating layer (B). On the other hand, since (a) the olefin-based copolymer emulsion is not highly sticky, when the coating amount is too large, adhesiveness of offset printing ink to the coating layer surface sometimes decreases instead.

This coating layer formation step is preferably performed continuously by the roll-to-roll method. This can improve the productivity of thermoplastic resin film. Furthermore, in the roll-to-roll method, since the thickness of the coating layer (B) can be adjusted relatively easily, a thermoplastic resin film having a desired texture can be easily produced, such as reducing the thickness of the coating layer (B) while maintaining printing applicability.

Additionally, the coating layer formation step may also be performed on the same production line as the line for producing the base layer (A) or may be performed on a different line from that for producing the base layer (A).

<<Adhesive Sheet>>

Next, the adhesive sheet of the present invention will be described.

The adhesive sheet of the present invention contains the thermoplastic resin film of the present invention and an adhesive agent layer provided on the surface of the base layer (A), on which the thermoplastic resin film is provided, on the side opposite the coating layer (B). For the structure of that thermoplastic resin film, the description in the section "Thermoplastic resin film" above can be referred to. Here, the adhesive agent layer and the release sheet (D), which is provided as necessary, will be described.

<Adhesive Layer (C)>

Examples of the adhesive used in the adhesive layer (C) include those described on pages 20 to 88 of the Handbook of Adhesives, 3rd edition (published by the Japan Adhesive Tape Manufacturers Association). Specific examples of the adhesive include rubber-based adhesives obtained by dissolving polyisobutylene rubber, butyl rubber, or a mixture thereof in an organic solvent such as benzene, toluene, xylene, or hexane; adhesives obtained by blending a tackifier such as rosin abietate ester, terpene-phenol copolymer, or terpene-indene copolymer in these rubber-based adhesives; acrylic-based adhesives obtained by dissolving an acrylic-based copolymer having a glass transition point of not greater than −20° C., such as 2-ethylhexylacrylate-n-butyl acrylate copolymer and 2-ethylhexylacrylate-ethyl acrylate-methyl methacrylate copolymer, in an organic solvent; and emulsion-based adhesives containing the same components.

The adhesive agent layer may be formed by coating the surface of the base layer (A) on the side opposite the coating layer (B) with the above adhesive, and drying.

The coating amount of the adhesive, in terms of solid content, is normally from 3 to 40 g/m$^2$, and preferably from 10 to 30 g/m$^2$.

The thickness of the adhesive layer (C) is preferably from 10 to 50 μm in the case of an acrylic-based adhesive, and from 80 to 150 μm in the case of a rubber-based adhesive.

Furthermore, before coating with the adhesive, the surface of the base layer (A) on the side opposite the coating layer (B) (the surface on which the adhesive agent layer is formed) may be surface-treated or coated with an anchor coating agent. This can increase the peel strength between the base layer (A) and the adhesive layer (C).

As the surface treatment, corona discharge treatment is preferred. By performing corona discharge treatment on the surface of the base layer (A), in addition to improving the adhesiveness of the silicone release agent used in the release sheet (D) to be described later, it is possible to remove additives bleeding on the surface of the layer, which are also inhibitors when curing the silicone.

From the perspective of bringing out the effect of corona discharge treatment, the corona discharge treatment quantity is preferably not less than 10 W·min/m$^2$, and more preferably from 10 to 50 W·min/m$^2$. By setting the corona discharge treatment quantity to not less than 10 W·min/m$^2$, the peel strength between the base layer (A) and the adhesive layer (C) tends to sufficiently increase. Furthermore, when the corona discharge treatment quantity is not greater than 50 W·min/m$^2$, energy efficiency of the corona discharge treatment is good and it tends to promote bleed out of the additives inside the base layer (A). Additionally, coating unevenness due to charging of the film surface tend to be suppressed.

Examples of the anchor coating agent include polyurethane, polyisocyanate-polyetherpolyol, polyisocyanate-polyesterpolyol-polyethyleneimine, alkyl titanates, and the like. These anchor coating agents are generally made into a coating material for the coating layer by dissolving in water or an organic solvent such as methanol, ethyl acetate, toluene, hexane, or the like.

The coating amount of the anchor coat is normally not less than 0.01 g/m$^2$ and preferably not less than 0.05 g/m$^2$, and is normally not greater than 5 g/m$^2$ and preferably not greater than 2 g/m$^2$ in terms of solid content after coating and drying.

As the method for forming the above-mentioned adhesive layer (C), there is the so-called direct method, in which the base layer (A) is coated directly with the adhesive. The adhesive layer (C) may also be formed by a method of coating a release substrate with the adhesive, drying the adhesive, adhering the surface of the release substrate that was coated with adhesive on the side of the base layer (A) opposite the coating layer (B), and peeling the release substrate as necessary (reverse method). The formation procedure of the coating layer (B) and the adhesive agent layer may be a procedure in which the coating layer (B) is formed on the base layer (A) and then the adhesive agent layer is formed, or it may be a procedure in which the adhesive agent layer is formed on the base layer (A) and then the coating layer (B) is formed.

<Release Sheet (D)>

The release sheet (D) is not limited as long as it is a sheet of which the adhesive force with the adhesive layer (C) is lower than the adhesive force between the base layer (A) and the adhesive layer (C). Above all, a release sheet in which a sheet substrate such as paper or resin film is coated with a silicone release agent is advantageously used.

As the silicone release agent, those described in the Silicone Handbook (published by Nikkan Kogyo Shimbun Ltd., pages 518 to 530) may be used, among which those that are widely used and sold as film release silicone agents, such as addition reaction-type silicones, ultraviolet-curable silicones, and silicone-modified heat-curable resins, can be used. Additionally, reaction control agents, peel regulating agents, slip improving agents, and the like may be added to these raw materials at an appropriate time.

From the perspective of uniformly distributing the release agent on the sheet substrate surface, the coating amount of solids of the silicone release agent is preferably not less than 0.03 g/m$^2$ and more preferably not less than 0.05 g/m$^2$, and is preferably not greater than 5 g/m$^2$ and more preferably not greater than 1 g/m$^2$. When the coating amount of solids is less than the range given above, peel strength becomes too high and uneven peeling tend to occur. On the other hand, when the coating amount of solids is greater than the range given above, the release sheet (D) sometimes drops off from the adhesive layer (C).

The sheet substrate may be coated with the silicone release agent using a coating device such as a die coater, bar coater, lip coater, roll coater, gravure coater, spray coater, blade coater, air knife coater, size press coater, or the like.

<<Thermal Transfer Image-receiving Sheet>>

Next, the thermal transfer image-receiving sheet of the present invention will be described.

The thermal transfer image-receiving sheet of the present invention is employed in the melt thermal transfer printing method, and contains the thermoplastic resin film of the present invention or the adhesive sheet of the present invention. With this thermal transfer image-receiving sheet, an image is printed by ink being transferred to the coating layer (B) by hot melt transfer.

For the structure of the thermoplastic resin film, the description in the section "Thermoplastic resin film" above can be referred to, and for the structure of the adhesive sheet, the description in the section "Adhesive sheet" above can be referred to.

<<Printing Method>>

Because the thermoplastic resin film and the adhesive sheet of the present invention contain the coating layer (B), direct printing by the offset method, relief method, gravure method, flexo method, and silk screen method can be performed using either oily ink or ultraviolet-curable ink, dot impact method, melt thermal transfer printing method, ink jet methods such as ultraviolet-curable ink jet and hot melt ink jet, and the laser marking method. Additionally, due to a receiving layer suited to various printing methods being provided on the coating layer (B), it can be employed in the sublimation thermal transfer printing method, ink jet methods such as aqueous ink jet, oily ink jet, ultraviolet-curable ink jet, and hot melt ink jet, the electrostatic destruction method, and the direct thermal printing method.

EXAMPLES

The present invention will be more specifically described later while citing production examples, working examples, and test examples, but the materials, used amounts, proportions, treatment contents, treatment procedures, and the like may be modified as appropriate as long as they do not deviate from the spirit of the present invention. Therefore, the scope of the present invention should not be interpreted as being constrained by the specific examples given below.

[Production Example of Thermoplastic Resin Film]

A mixture of 60% by mass of propylene homopolymer (brand name: Novatec PP FY6, manufactured by Japan Polypropylene Corporation) having an MFR (melt mass flow rate set forth in JIS K 7210: 1999, 230° C.) of 2.4 g/10 min and a melting point of 164° C., 14% by mass of propylene homopolymer (brand name: Novatec PP MA3, manufactured by Japan Polypropylene Corporation) having an MFR (230° C.) of 9.2 g/10 min and a melting point of 164° C., 10% by mass of high-density polyethylene (brand name: Novatec HD US070G, manufactured by Japan Polypropylene Corporation) having an MFR (190° C.) of 10 g/10 min and a melting point of 132° C., and 16% by mass of heavy calcium carbonate (brand name: Softon 1800, manufactured by Bihoku Funka Kogyo Co., Ltd.) having a volume-average particle size of 1.5 μm were supplied to an extruder (PM-115, manufactured by Mitsubishi Heavy Industries, Ltd.) set to 270° C., and after being kneaded, the resultant product was extruded from the extruder in a sheet, and by cooling using a cooling drum, an unstretched sheet (basic material film) was obtained. The obtained unstretched sheet was again heated to 150° C., and then stretched 5 times in the machine direction (MD direction) utilizing the circumferential speed differential of a group of rollers, and a 5-times longitudinally stretched film was obtained.

Separately from the above steps, a mixture of 22% by mass of propylene homopolymer (brand name Novatec PP FY6, manufactured by Japan Polypropylene Corporation) having an MFR (230° C.) of 2.4 g/10 min and a melting point of 164° C., 30% by mass of propylene homopolymer (brand name Novatec PP MA3, manufactured by Japan Polypropylene Corporation) having an MFR (230° C.) of 9.2 g/10 min and a melting point of 164° C., 3% by mass of high-density polyethylene (brand name Novatec HD US070G, manufactured by Japan Polypropylene Corporation) having an MFR (190° C.) of 10 g/10 min and a melting point of 132° C., and 45% by mass of heavy calcium carbonate (brand name Softon 1800, manufactured by Bihoku Funka Kogyo Co., Ltd.) having a volume-average particle size of 1.5 μm were supplied to two extruders set to 270° C., and after being kneaded, the resultant product was extruded from the extruder in a sheet, and then laminated on both surfaces of the 5-times longitudinally stretched film obtained in the above step, to obtain a three-layer film.

Then, after the three-layer film obtained by the above steps was cooled to 60° C., it was again heated to 155° C., and stretched 7.5 times in the transverse direction (TD direction) using a tenter. It was then annealed at 165° C., and after cooling to 60° C., it was slit an edge of the film, and a three-layer stretched film was obtained.

The total thickness of the obtained three-layer stretched film was 80 μm, and the thicknesses of the layers were 15 μm, 50 μm, and 15 μm, respectively. The density of the three-layer stretched film was 0.79 g/cm$^3$, porosity was 29%, opacity was 90%, and whiteness was 95%. Note that the thickness, density, porosity, opacity, and whiteness of the three-layer stretched film were measured by the following methods.

(Measurement Methods) 1. Thickness

Thickness was measured using a constant pressured thickness measurement instrument (manufactured by High Bridge Seisakusho Co., Ltd.) in conformance with JIS P 8118.

2. Density

Density was calculated using the following formula. In the formula below, basis weight was measured by weighing a sample punched to a size of 100 mm×100 mm using an electronic balance in conformance with JIS P 8124. Density (g/m$^3$)=basis weight (g/m$^2$)/thickness (m)

3. Porosity

Porosity was calculated using the following formula.

Porosity (%)=(ρ0−ρ/ρ0×100

Here, $\rho_0$ denotes the true density of the base layer (A) determined by the water displacement method, and ρ denotes the density of the base layer (A) determined from the density and blending proportion of each material that constitutes the base layer (A).

4. Opacity

Opacity was measured using a color meter (touch panel color computer SM-T, manufactured by Suga Test Instruments Co., Ltd.) in conformance with JIS Z 8722.

5. Whiteness

Whiteness was measured using a color meter (touch panel color computer SM-T, manufactured by Suga Test Instruments Co., Ltd.) in conformance with JIS L 1015.

[Production of Olefin-based Copolymer Emulsion]

((a2) Production of Dispersing Agent)

40 kg of isopropanol (brand name TOKUSO IPA, manufactured by Tokuyama Corporation) was put in a reactor having an internal capacity of 150 L equipped with a cooler, a nitrogen introduction tube, a stirrer, a monomer dropping funnel, and a heating jacket. Then, while stirring, 12.6 kg of N,N-dimethylamino ethyl methacrylate (brand name Methacrylate DMA, manufactured by Sanyo Chemical Industries, Ltd.), 12.6 kg of butyl methacrylate (brand name Acryester B, manufactured by Mitsubishi Rayon Co., Ltd.), and 2.8 kg of higher alcohol methacrylic acid ester (brand name Acryester SL, mixture of lauryl methacrylate and tridecyl methacrylate, manufactured by Mitsubishi Rayon Co., Ltd.) were put in the reactor. Then, after nitrogen replacement, the internal temperature was raised to 80° C., and 0.3 kg of azobisisobutyronitrile (brand name V-60 (AIBN), manufactured by Wako Pure Chemical Industries, Ltd.) was added as a polymerization initiator, and polymerization was initiated.

After performing polymerization for 4 hr while holding the reaction temperature at 80° C., the obtained copolymer was neutralized using 4.3 kg of glacial acetic acid (manufactured by Wako Pure Chemical Industries, Ltd.), and then 48.3 kg of ion exchange water was added while distilling out the isopropanol to perform exchange inside the system, and an aqueous solution of a neutral product of cationic polymeric emulsifier made from (meth)acrylic-based copolymer was obtained (solid concentration 35% by weight). The weight-average molecular weight of the obtained polymeric emulsifier was 40,000.

Production Examples of Olefin-based Copolymer Emulsion

Production Example 1

Emulsion of Average Particle Size 0.5 μm

Using a twin-screw extruder (TEX30HSS, manufactured by Japan Steel Works, Ltd.), the raw material resin was melt-kneaded and emulsified by the following procedure, and an emulsion having an average particle size of 0.5 μm was produced.

Specifically, 2.0 kg of pellet-like ethylene-methacrylic acid-acrylic acid ester copolymer (NUCREL N035C, manufactured by Du Pont-Mitsui Polychemicals Co., Ltd.) as (a1) the olefin-based copolymer was supplied from a hopper to an extruder, and melt-kneaded at a screw rotational speed of 270 rpm and a cylinder temperature of 160° C. to 250° C. Then, an aqueous solution of (a2) dispersing agent produced in the production example above was supplied from an inlet port in the middle part of the cylinder so as to result in 20 parts by mass of (a2) relative to 100 parts by weight of (a1) (in terms of solid content), and this was emulsified and dispersed to obtain a white olefin-based copolymer emulsion from the outlet of the extruder.

The solid content of the emulsion was 45% by mass, and the volume-average particle size was 0.5 μm.

Production Example 2

Emulsion of Average Particle Size 0.7 μm

An olefin-based copolymer emulsion was produced in the same manner as Production Example 1 except that the screw rotational speed of the extruder was set to 300 rpm, the supplied amount of resin was tripled, and the used amount of (a2) dispersing agent was reduced to 75%.

The solid content of the obtained emulsion was 45% by mass, and the volume-average particle size was 0.7 μm.

Production Example 3

Emulsion of Average Particle Size 1.0 μm

Kneading was performed and an olefin-based copolymer emulsion was produced in the same manner as Production Example 2 except that the screw rotational speed was changed to 230 rpm.

The solid content of the obtained emulsion was 45% by mass, and the volume-average particle size was 1.0 μm.

Production Example 4

Emulsion of Average Particle Size 1.3 μm

Kneading was performed and an olefin-based copolymer emulsion was produced in the same manner as Production Example 2 except that the screw rotational speed was changed to 100 rpm.

The solid content of the obtained emulsion was 45% by mass, and the volume-average particle size was 1.3 μm.

Production Example 5

Emulsion of Average Particle Size 0.75 μm

An olefin-based copolymer emulsion was produced according to the production method of (A) component described in Japanese Unexamined Patent Application Publication No. 2002-113959A.

The solid content of the obtained emulsion was 45% by mass, and the volume-average particle size was 0.75 μm.

The volume-average particle size of the emulsion was measured as follows.

(Volume-Average Particle Size)

Volume-average particle size was measured using a laser diffraction particle size distribution measurement apparatus (SALD-2200, manufactured by Shimadzu Corporation).

[Production of (b) Ethyleneimine-based Resin]

In a four-necked flask equipped with a stirrer, a reflux cooler, a thermometer, and a nitrogen gas introduction port, 100 parts by mass of an aqueous solution containing 25% by mass of polyethyleneimine (brand name Epomin P-1000, manufactured by Nippon Shokubai Co., Ltd.), 10 parts by mass of 1-chlorobutane (reagent, manufactured by Wako Pure Chemical Industries, Ltd.), and 10 parts by mass of propylene glycol monomethyl ether (reagent, manufactured by Wako Pure Chemical Industries, Ltd.) were introduced and stirred under nitrogen gas flow, and a modification reaction was performed for hr at 80° C. Then, water was added to the solution to adjust the solid concentration to 20% by mass, and a solution of (b) ethyleneimine-based resin was obtained.

[Production of (c) Antistatic Agent]

35 parts by mass of N,N-dimethylamino ethyl methacrylate (manufactured by Mitsubishi Gas Chemical Company, Inc.), 20 parts by mass of ethyl methacrylate (reagent, manufactured by Wako Pure Chemical Industries, Ltd.), 20 parts by mass of cyclohexyl methacrylate (reagent, manufactured by Wako Pure Chemical Industries, Ltd.), 25 parts by mass of stearyl methacrylate (reagent, manufactured by Wako Pure Chemical Industries, Ltd.), 150 parts by mass of ethyl alcohol, and 1 part by mass of 2,2'-azobis(isobutyronitrile) (reagent, manufactured by Wako Pure Chemical Industries, Ltd.) were introduced into a four-necked flask equipped with a stirring device, a reflux cooling pipe (condenser), a thermometer, and a dropping funnel, nitrogen exchange was performed inside the system, and a polymerization reaction was performed for 6 hr at 80° C. under nitrogen gas flow. Then, 85 parts by mass of an aqueous solution containing 50% by mass of 3-chloro-2-hydroxypropyl trimethyl ammonium chloride (reagent, manufactured by Wako Pure Chemical Industries, Ltd.) was added and reacted for an additional 15 hr at 80° C., and then the ethyl alcohol was distilled out while water was added drop-wise, and a solution of (c) antistatic agent made from a quaternary ammonium salt-type copolymer with a solid concentration of 20% by mass was obtained.

Working Example 1

(Preparation of Coating Material for Coating Layer (B))

An aqueous solution containing 12.97% by mass of (a) the olefin-based copolymer emulsion obtained in Production Example 1, 0.43% by mass of (b) the ethyleneimine-based resin, 0.55% by mass of (c) the antistatic agent, and 0.55% by mass of polyamide-epichlorohydrin resin (WS4082, manufactured by Seiko PMC Corporation, solid concentration 25%) as (d) the crosslinking agent was prepared, and a coating material for the coating layer (B) was obtained. Furthermore, the concentration of each of the components in the coating layer (B) represents the solid content of each component relative to the entire amount of the coating material.

(Formation of Coating Layer (B))

Using a continuous coating apparatus, corona discharge treatment was performed on one surface of the thermoplastic resin film obtained in the above production example, and coating and drying of the coating material for the coating layer (B) were performed to provide the coating layer (B).

Corona discharge treatment was performed using a corona discharge treatment apparatus (HF400F, manufactured by Kasuga Electric Works Ltd.), an aluminum discharge electrode of length 0.8 m, and a silicone film roller as an insulation roller, with a 5 mm gap between the discharge electrode and insulation roller, a line processing speed of 15 m/min, and an applied energy density of 4,200 J/m$^2$. Then, the coating layer for the coating layer (B) was applied using a roll coater and immediately dried with a 60° C. hot air drying apparatus, and then wound up with a roll winding apparatus to obtain a thermoplastic resin film of Working Example 1. The solid content of the coating layer (B) after drying was 0.23 g/m$^2$.

Comparative Example 1

A thermoplastic resin film of Comparative Example 1 was obtained in the same manner as Working Example 1 except that instead of (a) the olefin-based copolymer emulsion obtained in Production Example 1, the olefin-based copolymer emulsion obtained in Production Example 3 was used. The solid content of the coating layer (B) after drying was 0.15 g/m$^2$.

Comparative Example 2

A thermoplastic resin film of Comparative Example 2 was obtained in the same manner as Working Example 1 except that (a) the olefin-based copolymer emulsion was not used, and it contained 0.40% by mass of (c) the antistatic agent and 0.40% by mass of (d) the crosslinking agent. The solid content of the coating layer (B) after drying was 0.02 g/m$^2$.

The thermoplastic resin films obtained in Working Example 1 and Comparative Examples 1 and 2 were evaluated with regard to gold ink printing applicability, paper dust quantity, and hot melt transfer applicability. The results are shown in Table 1.

Working Example 2

(Preparation of Coating Material for Coating Layer (B))

An aqueous solution containing 17.90% by mass of (a) the olefin-based copolymer emulsion obtained in Production Example 1, 0.60% by mass of (b) the ethyleneimine-based resin, 0.75% by mass of (c) the antistatic agent, and 0.75% by mass of polyamide-epichlorohydrin resin (WS4082, manufactured by Seiko PMC Corporation, solid concentration 25%) as (d) the crosslinking agent was prepared, and a coating material for the coating layer (B) was obtained.

(Formation of Coating Layer (B))

Using a continuous coating apparatus, corona discharge treatment was performed in the same manner as Working Example 1 on one surface of the thermoplastic resin film obtained in the above production example, and after it was wound up unaltered with a roll winding apparatus, A4 size sheets were cut out from the roll to obtain sheets for coating.

Then, the above A4-size thermoplastic resin films were set in a batch coating apparatus and the corona discharge treated surface was coated with the coating material for the coating layer (B) using a Meyer bar, and this was dried to provide a coating layer (B). Then, the coating layer for the coating layer (B) was applied and immediately dried with a 60° C. hot air drying apparatus, and a thermoplastic resin film of Working Example 2 was obtained. The solid content of the coating layer (B) after drying was 0.23 g/m².

Working Example 3 and Comparative Examples 3 to 5

A thermoplastic resin film was obtained in the same manner as Working Example 2 except that instead of (a) the olefin-based copolymer emulsion obtained in Production Example 1, those produced using (a) the olefin-based copolymer emulsions produced in the productions examples shown in Table 1 were used. The solid content of the coating layer (B) after drying is also shown in Table 1.

[Evaluation Methods]

(1) Gold Ink Printing Applicability (Printing)

The obtained thermoplastic resin film was humidified for 3 days at 23° C. and relative humidity 50%. Solid printing was performed on the coating surface of the thermoplastic resin film after humidification. Using an RI-III printing applicability tester (manufactured by Akira Seisakusho Co., Ltd.) as the printer and using ultraviolet-curable gold printing ink (brand name Megacure UV 550X Supergold, manufactured by Megami Ink, Inc.) as the ink, the ink quantity was set to 1.5 g/m². Next, the printed surface was irradiated with ultraviolet rays to dry and solidify the ink. Using one metal halide lamp (manufactured by Eye Graphics Co., Ltd.) with power of 80 W/cm, the thermoplastic resin film was passed through once at a speed of 10 m/min with the distance between the ultraviolet lamp and the thermoplastic resin film set to 10 cm.

(Glossiness Evaluation)

The glossiness of the printed surface after drying and solidification was measured as 75 degree glossiness using a hand-held gloss meter model PG-1, manufactured by Nippon Denshoku Industries Co., Ltd.

(Macroscopic Evaluation)

The glossiness of the printed surface was determined macroscopically.

The determination criteria were as follows, and level ○ was considered passing.

○: Good: Exhibits excellent metallic gloss

Δ: Poor: Metallic gloss is weak

×: Bad: No metallic gloss, and appears somewhat brown (2) Paper Dust Quantity Evaluation (Paper Dust Collection)

A black cloth was glued onto the bottom surface of a weight, and it was rubbed over the surface of the coating layer (B) of the thermoplastic resin film to collect paper dust. The weight had a mass of 200 g, the diameter of the bottom surface was 30 mm, and brand name Color Twill BK 7431-28 (manufactured by Kurabo Industries Ltd.) was used as the black cloth. The amount of movement of the weight was a total of 5 m.

(Numeric Evaluation)

The amount of change in black concentration as the paper dust became attached to the black cloth was measured using a spectrophotometer. The black concentration was measured using a SpectroEye (manufactured by X-Rite, Inc.) as the spectrophotometer and a gas-filled tungsten lamp (C2/D65) as the light source, and the difference in concentration from before paper dust attachment to after paper dust attachment was expressed as ΔO.D.

(Macroscopic Evaluation)

Next the quantity of paper dust attached to the above black cloth was macroscopically determined. The determination criteria were as follows, and level ◎ or ○ was considered passing.

◎: Almost no whitening

○: Some whitening, but not a problematic level.

×: Whitened, to a level at which trouble with paper dust would occur in practical use (3) Hot Melt Transfer Applicability Evaluation (Print)

A bar code was printed on the surface of the coating layer (B) of the thermoplastic resin film using a printer. Using model B-30-S5 (manufactured by Tec Co., Ltd.) as the printer, brand name B110C (manufactured by Ricoh Co., Ltd.) as the ink ribbon, and JIS X 0503:2012 "Automatic recognition and data acquisition technology Bar code symbol system specification Code 39" as the bar code, printing was performed at a print concentration setting of 27 in an environment at 23° C. and 50% relative humidity.

(Ink Transferability Evaluation)

The obtained print was evaluated using a bar code reader. The bar code printed on the thermoplastic resin film was evaluated based on ANSI grade (ranks A to D) set forth in ANSI X3.182-1990 using a LASERCHE II (manufactured by Fuji Electric Refrigerator Co. Ltd.,) as a bar code reader. Ink transferability was evaluated three times at different locations, and judged based on the following evaluation criteria.

Rank A: Excellent (can be identified in one scan in all three locations)

Rank B: Good (can be identified in two scans or fewer in all three locations)

Rank C: Acceptable (can be identified in four scans or fewer in all three locations)

Rank D: Unacceptable (cannot be identified in four scans in at least one location)

(Ink Adhesiveness Evaluation)

The thermoplastic resin film on which the bar code was printed which had undergone the above ink transferability evaluation was humidified for not less than 2 hr in an environment at 35° C. and 85% relative humidity. In the same environment, cellophane tape was stuck on top of the bar code and the air was pressed out with the fingers to fully adhere it, and then the cellophane tape was slowly peeled. As the cellophane tape, brand name Cellotape™ CT-18 manufactured by Nichiban Co., Ltd. was used. Immediately after the tape was peeled, the ANSI grade of the bar code was measured, and ink adhesiveness was evaluated. Ink adhesiveness was evaluated three times at different locations, and determined based on the following evaluation criteria.

Rank A: Excellent (can be identified by one scan in all three locations)

Rank B: Good (can be identified in two scans or fewer in all three locations)

Rank C: Acceptable (can be identified in four scans or fewer in all three locations)

Rank D: Unacceptable (cannot be identified in four scans in at least one location)

The thermoplastic resin films obtained in Working Examples 1 to 3 and Comparative Examples 1 to 5 were evaluated with regard to gold ink printing applicability, paper dust quantity, and hot melt transfer applicability. The evaluation results are shown in Table 1.

TABLE 1

| | Production Example | Emulsion (a) Volume-average particle size (μm) | Solid content of coating layer after drying (g/m²) | Gold ink printing applicability 75 degree glossiness (%) | Appearance | Paper dust quantity Change in concentration Δ O.D. | Macroscopic | Hot melt transfer applicability Ink transferability rank | Ink adhesiveness rank |
|---|---|---|---|---|---|---|---|---|---|
| Working Example 1 | Production Example 1 | 0.5 | 0.23 | 26.2 | ○ | 0.04 | ⊚ | A | A |
| Comparative Example 1 | Production Example 3 | 1.0 | 0.15 | 11.3 | X | 0.22 | ○ | A | A |
| Comparative Example 2 | 1) | 1) | 0.02 | 27.9 | ○ | 0.34 | X | C | D |
| Working Example 2 | Production Example 1 | 0.5 | 0.23 | 20.9 | ○ | 0.06 | ⊚ | 2) | 2) |
| Working Example 3 | Production Example 2 | 0.7 | 0.16 | 18.2 | ○ | 0.14 | ○ | 2) | 2) |
| Comparative example 3 | Production Example 3 | 1.0 | 0.25 | 15.9 | Δ | 2) | 2) | 2) | 2) |
| Comparative example 4 | Production Example 4 | 1.3 | 0.17 | 13.5 | X | 2) | 2) | 2) | 2) |
| Comparative example 5 | Production Example 5 | 0.75 | 0.18 | 16.3 | Δ | 0.20 | ○ | 2) | 2) |

1) Emulsion not used
2) Not evaluated

Working Example 4

Adhesive processing was performed on the thermoplastic resin film obtained in Working Example 1 using a continuous coating apparatus.

The surface of the base layer (A) which had not been coated with the coating layer (B) obtained in Working Example 1 was coated with an adhesive agent (brand name Olibain BPS-1109, manufactured by Toyo Ink Co., Ltd.) in an amount of 25 g/m² in terms of solid content to form an adhesive layer (C), and then (D) a release paper (brand name Noncurl, thickness 150 μm, manufactured by Oji Kako Co., Ltd.) was laminated on top of it to obtain an adhesive sheet.

As is understood from Table 1, the thermoplastic resin films of Working Examples 1 to 3 had high 75 degree glossiness of the gold ink printed surface, and had a good appearance. Additionally, there was little generation of paper dust, and ink transferability and ink adhesiveness were excellent.

On the other hand, the thermoplastic resin films of Comparative Examples 1 and 3 to 5, in which the volume-average particle size of the olefin-based copolymer emulsion was greater than 0.72 μm, had less than 17% glossiness of the gold ink printed surface, and appearance was poor or bad.

Furthermore, the thermoplastic resin film of Comparative Example 2, which did not use an olefin-based copolymer emulsion, had poor ink transferability and ink adhesiveness.

Additionally, in contrast to Working Example 3, in which the volume-average particle size of the olefin-based copolymer emulsion was 0.7 μm, Working Example 2 in which the volume-average particle size was 0.5 μm had good 75 degree glossiness of the gold ink printed surface and good appearance.

Furthermore, the hot melt transfer applicability evaluation of Working Example 1 was good, which was the same as Comparative Example 1, and no adverse effects were seen even when the volume-average particle size of the olefin-based copolymer emulsion was small. Thus it was understood that the thermoplastic resin film of the present invention is advantageous as a thermal transfer image-receiving sheet.

On the other hand, in the paper dust evaluation of Working Examples 1 to 3, the degree of coverage of the thermoplastic resin film by the resin particles made from olefin-based copolymer can be understood as follows (simply called "degree of coverage" hereinafter; 0 when completely uncovered, 1 when completely covered). Comparative Example 2 is an example in which the degree of coverage was very close to 0, and it was not acceptable with regard to paper dust quantity evaluation. Also, when the particle size was large, as in Comparative Examples 1, 3, and 4, coverage was incomplete and inorganic particles were exposed on the surface. Therefore, the degree of coverage was not high, and even though the paper dust evaluation was good, it was not better than level ○. On the other hand, when the volume-average particle size was small, at not greater than 0.72 μm, as in Working Examples 1 to 3, the number of particles present on the thermoplastic resin film surface increased and the degree of coverage improved. As a result, the paper dust evaluation was level ○ or higher level, and in Working Examples 1 and 2 in which the volume-average particle size was 0.5 μm, the paper dust evaluation was level ⊚, and the amount of change in concentration (ΔO.D.) was dramatically improved over Working Example 3. From the above facts it was understood that the thermoplastic resin film of the present invention generates little paper dust and is advantages as a base film for processing.

Furthermore, as is clear from Working Example 4, it was found that the thermoplastic resin film of the present invention is advantageous as a substrate for an adhesive sheet.

INDUSTRIAL APPLICABILITY

According to the present invention, the thermoplastic resin film, adhesive sheet, and thermal transfer image-receiving sheet pertaining to the present invention have excellent glossiness when printed with gold ink. Furthermore, the amount of paper dust generation is small and hot melt transfer applicability is high. Therefore, they can be advantageously used in the field of packaging films or labels printed with both glamorous printing using gold ink and digital data such as bar codes, as in product packages and the like.

REFERENCE SIGNS LIST (A) Base layer
(B) Coating layer

The invention claimed is:

1. A thermoplastic resin film comprising a base layer (A) containing a thermoplastic resin and a coating layer (B) provided on at least one surface of the base layer (A), the coating layer (B) containing components derived from (a) an emulsion containing resin particles formed from an olefin-based copolymer and (b) an ethyleneimine-based resin, wherein a volume-average particle size of the resin particles contained in the emulsion is from 0.1 to 0.70 µm, and the resin particles are present on a surface of the thermoplastic resin film.

2. The thermoplastic resin film according to claim 1, wherein the coating layer (B) further contains (c) an antistatic agent.

3. The thermoplastic resin film according to claim 1, wherein the coating layer (B) further contains (d) a cross-linking agent.

4. The thermoplastic resin film according to claim 1, wherein the thermoplastic resin contains an olefin-based copolymer.

5. The thermoplastic resin film according to claim 1, wherein the base layer (A) contains at least one of an inorganic fine powder and an organic filler.

6. The thermoplastic resin film according to claim 1, wherein the coating layer (B) contains from 10 to 99% by mass of solids derived from the emulsion.

7. The thermoplastic resin film according to claim 1, wherein a coating amount of the coating layer (B) is from 0.05 to 1.40 $g/m^2$.

8. The thermoplastic resin film according to claim 1, wherein the base layer (A) is stretched in at least a uniaxial direction.

9. The thermoplastic resin film according to claim 1, wherein 75 degree glossiness of a surface of the coating layer (B) is from 14 to 50%.

10. An adhesive sheet comprising the thermoplastic resin film described in claim 1 and an adhesive layer (C) provided on a surface of the base layer (A) on a side opposite the coating layer (B) of the thermoplastic resin film.

11. The adhesive sheet according to claim 10, wherein a release sheet (D) is provided on a surface of the adhesive layer (C) on a side opposite the base layer (A).

12. A thermal transfer image-receiving sheet comprising the thermoplastic resin film described in claim 1.

* * * * *